UNITED STATES PATENT OFFICE.

ERASMUS B. COLLINS, OF CHICAGO, ILLINOIS, ASSIGNOR OF ONE-HALF TO EDWARD MIZE, OF SAME PLACE.

PROCESS OF AND COMPOUND FOR RENDERING CLOTH IMPERVIOUS TO WATER.

SPECIFICATION forming part of Letters Patent No. 285,734, dated September 25, 1883.

Application filed August 25, 1883. (No specimens.)

*To all whom it may concern:*

Be it known that I, ERASMUS B. COLLINS, of the city of Chicago, county of Cook, and State of Illinois, have invented certain Improvements in Processes of and Compounds for Rendering Cloth Impervious to Water, of which the following is a specification.

My improved compound for rendering cloth impervious to water consists of two divisions, each compounded according to its own process, and then the two are added together, and then finished according to a third process, all of which is hereinafter more fully described and specified.

The first division is composed of one gallon of cotton-seed oil, four ounces of burnt umber, six ounces of sugar of lead, eight ounces of litharge, and one ounce of gum-copal, all mixed together and put into a kettle, and the temperature of the whole raised to 400° Fahrenheit, and kept at that temperature for two hours.

The second division is composed of three ounces of gutta-percha chips, three ounces of ground sulphur, one gallon of naphtha, and one and a half pound of lamp-black, all of which are mixed together at a temperature not higher than 60° Fahrenheit, and allowed to stand in a cool place, say, one hour, and then raised to a temperature of 75°, and after remaining at this temperature for thirty minutes the whole is put into the same kettle with the first division, and then the whole, composed of the two divisions, should be raised to as high a temperature as it may be without resulting in combustion, and kept so for one hour and a half, after which it may be left to stand until its temperature is reduced to 200° Fahrenheit, and there should be added five ounces of japan, and then it will be fit for use when it shall have become cool.

The sulphur and lamp-black are important agents, as they prevent the naphtha from exploding; and the substitution of cotton-seed oil for linseed-oil, which has heretofore been used in such compositions, is quite important, since it renders the compound free from an offensive odor; and the use of the gutta-percha in the compound renders the cloth coated and saturated with it more pliable and elastic and better adapted to being sewed.

No claim is made herein for any process of or implements for applying the compound to the cloth, and it may be done in any suitable manner with any proper tools and appliances.

What I claim as my invention, and desire to secure by Letters Patent, is—

1. The combination of the cotton-seed oil, sugar of lead, burnt umber, litharge, and gum-copal, in about the quantities described in the said first division, substantially as set forth.

2. The combination of the gutta-percha chips, ground sulphur, naphtha, and lamp-black, in about the proportions above specified in the second division, substantially as set forth.

3. The combination of the five ounces of japan with the two compounds made up of the first and second divisions, respectively, substantially as set forth.

4. The described process of compounding the specified ingredients constituting the first division, substantially as set forth.

5. The described process of compounding the specified ingredients constituting the second division, substantially as set forth.

6. The described process of compounding the five ounces of japan with the first and second divisions after they have been cooked together at the highest temperature short of explosiveness, substantially as set forth.

ERASMUS B. COLLINS.

Witnesses:
W. J. BOWEN,
R. B. MITCHELL.